(12) United States Patent
Nishikata et al.

(10) Patent No.: US 10,066,937 B2
(45) Date of Patent: Sep. 4, 2018

(54) MEASUREMENT SYSTEM AND MEASURING METHOD

(71) Applicant: MITSUBISHI HEAVY INDUSTRIES, LTD., Tokyo (JP)

(72) Inventors: Shingo Nishikata, Tokyo (JP); Yuki Uchiyama, Tokyo (JP); Hiroyuki Daigo, Tokyo (JP); Takuya Koyama, Tokyo (JP); Hiroki Uchida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1066 days.

(21) Appl. No.: 13/908,238

(22) Filed: Jun. 3, 2013

(65) Prior Publication Data

US 2014/0192340 A1    Jul. 10, 2014

(30) Foreign Application Priority Data

Jan. 8, 2013 (JP) ................................. 2013-001432

(51) Int. Cl.
*G01C 3/02* (2006.01)
*G01S 17/46* (2006.01)
*G01S 17/74* (2006.01)

(52) U.S. Cl.
CPC ................ *G01C 3/02* (2013.01); *G01S 17/46* (2013.01); *G01S 17/74* (2013.01)

(58) Field of Classification Search
CPC ........... G01S 17/74; G01S 17/00; G01S 17/42
USPC ................................................ 356/3.01–5.15
See application file for complete search history.

(56) References Cited

U.S. PATENT DOCUMENTS

| | | | |
|---|---|---|---|
| 4,113,382 A | | 9/1978 | Freudenschuss |
| 5,889,490 A | * | 3/1999 | Wachter .................. G01S 17/36 342/127 |
| 5,982,480 A | * | 11/1999 | Itzkovich ................ G01S 17/74 356/141.1 |

(Continued)

FOREIGN PATENT DOCUMENTS

| | | |
|---|---|---|
| JP | 64-25784 | 2/1989 |
| JP | 5-505682 | 8/1993 |

(Continued)

OTHER PUBLICATIONS

Notification of Reasons for Refusal dated Nov. 22, 2016 in corresponding Japanese Application No. 2013-001432 (with partial English translation).

(Continued)

*Primary Examiner* — Luke D Ratcliffe
(74) *Attorney, Agent, or Firm* — Wenderoth, Lind & Ponack, L.L.P.

(57) ABSTRACT

A ranging apparatus transmits an optical input signal to an optical signal input/output unit mounted on a measurement target. The optical signal input/output unit receives the optical signal and transmits an optical output signal applied with an optical change, to the ranging apparatus. The ranging apparatus receives the optical output signal, measures a propagation distance from a light source a the light receiving unit through the optical signal input/output unit, and measures a relative position of the optical signal input/output unit based on the propagation distance. Thus, a distributed aperture radar is realized from the ranging apparatus and the optical signal input/output unit.

14 Claims, 9 Drawing Sheets

(56) References Cited

U.S. PATENT DOCUMENTS 6,219,596 B1 * 4/2001 Fukae ................ G01S 17/74
                                                               180/169
6,473,716 B1    10/2002 Ohishi et al.

FOREIGN PATENT DOCUMENTS

| JP | 5-312954 | 11/1993 |
|---|---|---|
| JP | 6-2130 | 1/1994 |
| JP | 8-29534 | 2/1996 |
| JP | 2500377 | 5/1996 |
| JP | 2000-97703 | 4/2000 |
| JP | 2001-215275 | 8/2001 |
| JP | 2002-236175 | 8/2002 |
| WO | 91/02281 | 2/1991 |

OTHER PUBLICATIONS

Extended European Search Report dated Apr. 1, 2014 in corresponding European Patent Application No. 13170950.3.
European Office Action dated Mar. 9, 2017 in corresponding European Application No. 13170950.3.
Japanese Notification of Reasons for Refusal dated Jul. 5, 2017 in corresponding Japanese Patent Application No. 2013-001432 with English translation.

* cited by examiner

MEASUREMENT SYSTEM AND MEASURING METHOD

CROSS REFERENCE

This application claims a priority on convention based on Japanese Patent Application No. JP 2013-001432. The disclosure thereof is incorporated herein by reference.

TECHNICAL FIELD

The present invention relates to a measuring system, especially to a measuring system of a distributed aperture radar.

BACKGROUND ART

In a conventional technique in the field of a radar system, a "distributed aperture radar" is known in which the amplitude and phase of each of transmission and reception signals are controlled in a plurality of antennas (sub-arrays) distributed and fixedly arranged in predetermined positions, to perform beam synthesis.

As the measurement technique of a relative position of each of the plurality antennas (sub-arrays) distributed in the distributed aperture radar, (1) a measuring method by GPS, (2) a measuring method of tracking a pseudo target such as a metal sphere by each of the plurality of antennas with radar wave, and (3) a measuring method by installing a laser ranging apparatus on each antenna and tracking a laser beam. The details of the methods will be described below.

(1) the Measuring Method by GPS

The measurement by use of GPS has a measurement precision of 10 to 100 m in a single point positioning (single point instant measurement). Also, when interference position measurement such as static measurement (measurement by the GPS receivers at a known point and a measurement point for a time period of 30 minutes to 1 hour) is used, the measurement precision is an order of a few centimeters. Depending on the arrangement of the GPS satellites, the measurement precision is degraded.

(2) the Measuring Method by Tracking a Pseudo Target Antenna Such as a Metal Sphere by Each Antenna with Radar Wave When the pseudo target such as the metal sphere is tracked with the radar wave to measure a relative position, a measured relative position has a great variation because enough angular measurement precision cannot be obtained in the antennas (sub-arrays) distributed in a small area. In a single antenna, the antenna aperture is small so that a beam width spreads. As a result, the enough angular measurement precision cannot be attained. For this reason, in order to improve the angular measurement precision, the antennas are distributed in a large area to configure a distributed aperture antenna (large distributed aperture antenna).

Also, in the measurement using the GPS and the metal sphere, an approximate position of each of the antennas (sub-arrays) can be only measured in an order of the wavelength of the radar wave. Therefore, the transmission and reception of the radar wave in each antenna (sub-array) cannot be precisely controlled based on the relative position of the antenna (sub-array) even in the distributed aperture radar. That is, a correct beam cannot be formed. For example, when the wavelength of the radar wave used in the distributed aperture radar is in a range of several cm to several mm, the beam formation is influenced if the measurement precision is about several cm. That is, a limit is in the measurement precision in the position/direction measurement using the GPS and the metal sphere.

(3) the Measuring Method in which a Laser Ranging Apparatus is Installed on Each Antenna to Track with a Laser Beam When a distance measurement is carried out by using a laser beam, enough distance/direction measurement precision can be attained because the wavelength of the laser beam is sufficiently small, compared with that of the radio wave. In this case, however, if the laser ranging apparatus is installed on the each of the antennas (sub-arrays) to configure an alignment apparatus, it is disadvantageous in view of cost because the laser ranging apparatus is very expensive.

Patent Literature 1 (Japanese Patent No. 2,500,377) discloses a technique that a warp of a main mirror of a parabolic antenna for a satellite (a variation quantity from an ideal parabolic curved surface) is measured from a distant place. In the technique, light beams (4 incident beams, e.g. 4 laser beams) are irradiated from the earth to the main mirror of the satellite. Also, the light beams are reflected by warp measurement areas (e.g. 3 small concave mirrors) provided to be distributed on the antenna main mirror surface. Also, the reflection light beams from the warp measurement areas are collected and detected at the same time by an imaging sensor arranged on a beam collection position, so as to obtain a spot image. A variation from the ideal antenna main mirror surface is measured based on a difference between a reference spot image obtained from the ideal antenna main mirror surface and the spot image obtained at the time of measurement of mirror surface warp. However, in Patent Literature 1, the plurality of warp measurement areas (e.g. 3 small concave mirrors) have the function to merely reflect the incident beams.

CITATION LIST

[Patent literature 1] Japanese Patent No. 2,500,377

SUMMARY OF THE INVENTION

With reference to FIG. 1, an example of a case where the electromagnetic wave should be outputted in a same phase from each of antennas (sub-arrays) of the distributed aperture radar to a specific direction will be described.

In this case, it is assumed that the transmission direction of antenna (sub-array) 0 is $\theta_0$, the transmission direction of antenna (sub-array) 1 is $\theta_1$, and the transmission direction of antenna (sub-array) 2 is $\theta_2$. Also, it is assumed that a distance between the antenna (sub-array) 0 and the antenna (sub-array) 1 is $D_1$, and a distance between the antenna (sub-array) 0 and the antenna (sub-array) 2 is $D_2$. Also, it is assumed that the transmission phase of the antenna (sub-array) 0 is 0°, the transmission phase of the antenna (sub-array) 1 is $+(2\pi/\lambda) \times D_1 \times \sin(\theta_0)$, and the transmission phase of the antenna (sub-array) 2 is $+(2\pi/\lambda) \times D_2 \times \sin(\theta_0)$. At this time, in order to perform a beam control, antenna relative positions ($D_1$, $D_2$) and antennas relative angles ($\theta_0$, $\theta_1$, $\theta_2$) must be known.

Also, when the wavelength of the radar wave is supposed to be in a range of several mm to several cm, it is not possible to correctly perform the beam control, if the antenna measurement precision is in an order of about several cm. Even if the static measurement of GPS in high measurement precision is carried out, the precision is in an order of a few centimeters, and has an influence on the correct beam control for the radar wave.

In the present invention, a measuring apparatus transmits an optical signal to an optical signal input/output unit mounted on a measurement target. The optical signal input/output unit receives the optical signal from the measuring apparatus and transmits the optical signal applied with an optical change, to the measuring apparatus. The measuring apparatus receives the optical signal applied with the optical change from the optical signal input/output unit, measures a propagation distance from a light source to a light receiving unit through the optical signal input/output unit, and measures and calculates a relative position of the optical signal input/output unit based on the propagation distance. It should be noted that the measuring apparatus is provided with the light source which outputs the optical signal, and the light receiving unit which receives the optical signal applied with the optical change, such that three or more independent propagation paths of the optical signal from the light source to the light receiving unit through the optical modulation wave reflecting unit are acquired (for example, three light sources and three light receiving units, or three light sources and one light receiving unit, or one light source and three light receiving units, or two light sources and two light receiving units). Also, at least one measurement target exists, and at least one optical signal input/output unit is provided for every measurement target. For example, the relative position of the optical signal input/output unit is measured by a three-point intersection method (may be permitted even in case of three or more points) using the three or more light sources, three or more light receiving units and three or more optical signal input/output units.

In this way, in the distributed aperture radar, the position/direction measurement in a high precision is realized by using light wave.

DESCRIPTION OF EMBODIMENTS

[First Embodiment]

Hereinafter, a first embodiment of the present invention will be described in detail with reference to the attachment drawings.

In the present embodiment, a technique is proposed of measuring a relative position and a relative direction of each of a plurality of antennas (sub-arrays) configuring a distributed aperture antenna or a distributed aperture radar by a single laser ranging apparatus. It should be noted that they may be measured by a plurality of laser ranging apparatuses.

(Configuration Example of Measuring System)

Figure 1:
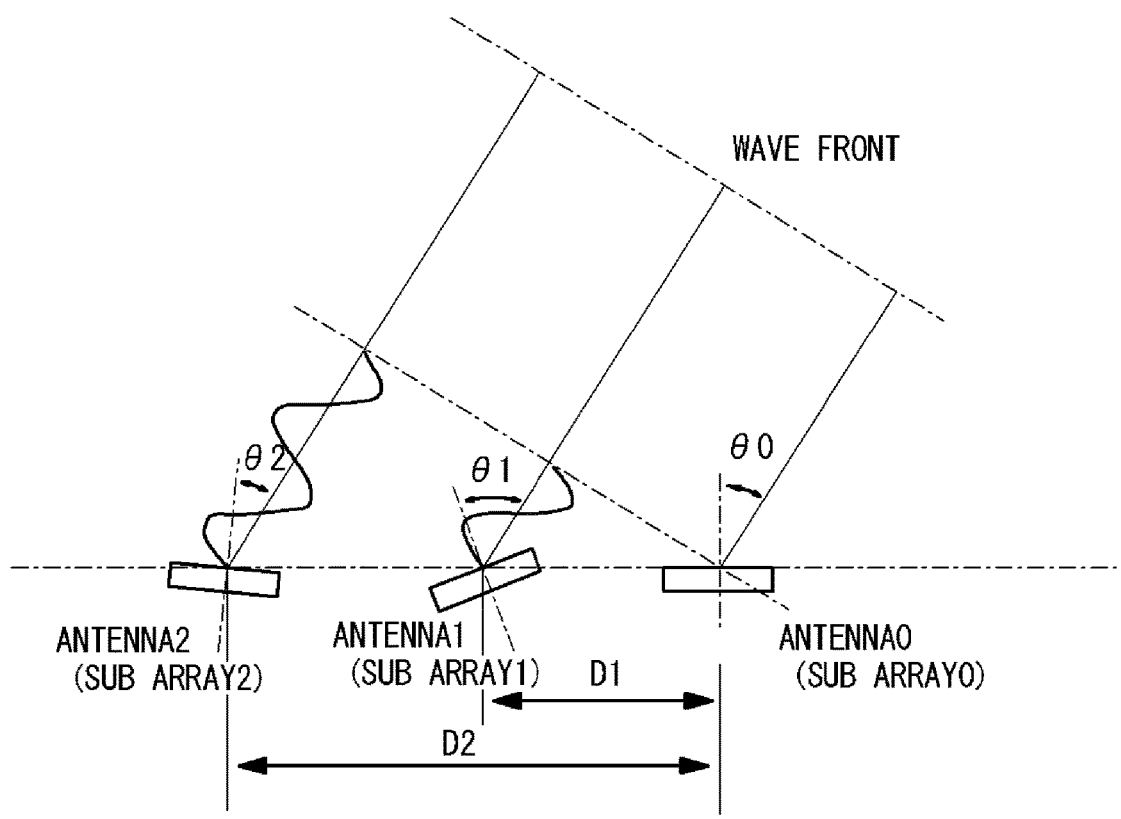
FIG. 1 is a diagram showing a prior art.
Figure 2:
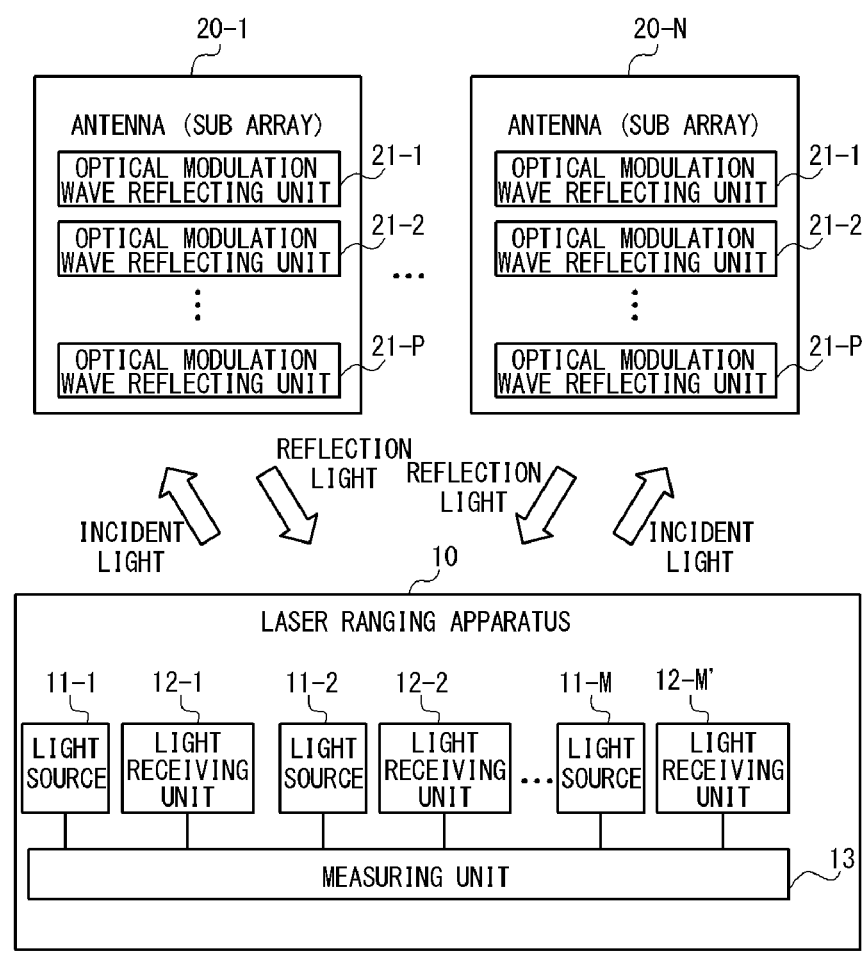
FIG. 2 is a diagram showing a configuration example of a measurement system according to the present invention.

As shown in FIG. 2, the measurement system according to the present embodiment contains a laser ranging apparatus 10 and antennas (sub-arrays) 20 (20-n, n=1 to N:N is an optional number).

The laser ranging apparatus 10 is provided with light sources 11 (11-m, m=1 to M:M is an optional number), light receiving units 12 (12-m, m=1 to M':M' is an optional number) and a measuring unit.

Each of the antennas (sub-arrays) 20 (20-n, n=1 to N) is provided with optical modulation wave reflecting units 21 (21-p, p=1 to P:P is an optional number).

Each of the light sources 11 (11-m, m=1 to M) arranged in the laser ranging apparatus 10 irradiates a beam to each of the optical modulation wave reflecting units 21 (21-p, p=1 to P) arranged in each of the antennas (sub-arrays) 20 (20-n, n=1 to N). The beam is equivalent to an optical signal. Each light source 11 is arranged on an appropriate position in an appropriate precision. The arrangement (a measurement value of a correct arrangement position) of each light source 11 is supposed to be previously stored to the laser ranging apparatus 10 as known data.

It should be noted that although each light source 11 of the laser ranging apparatus 10 generally is a laser beam source, each light source 11 is not limited to the laser beam source but may be a usual light source. That is, each light source 11 of the laser ranging apparatus 10 is not limited to the laser beam source.

Each of the light receiving units 12 (12-m, m=1 to M') arranged in the laser ranging apparatus 10 receives a reflection light beam from a corresponding one of the optical modulation wave reflecting units 21 (21-p, p=1 to P) arranged in each antenna (sub-array) 20. Each light receiving unit 12 is arranged in the appropriate position in an appropriate precision. The arrangement (measurement value of the correct arrangement) of each light receiving unit 12 is supposed to be previously inputted to the laser ranging apparatus 10 as known data.

The measuring unit 13 arranged in the laser ranging apparatus 10 measures a relative position of each optical modulation wave reflecting unit 21 based on the reflection light beam from each optical modulation wave reflecting unit 21. Specifically, the measuring unit 13 measures a propagation distance of an optical signal from the light source 11 to the light receiving unit 12 through the optical modulation wave reflecting unit 21, and measures the relative position of the optical modulation wave reflecting unit 21 based on the propagation distance.

Each optical modulation wave reflecting unit 21 arranged in each antenna (sub-array) 20 applies modulation to the incident light beam from each light source 11 arranged in the laser ranging apparatus 10 based on a pseudo random pattern and reflects the light beam applied with modulation. That is, the optical modulation wave reflecting unit 21 is an optical signal input/output unit which receives an optical signal as the incident light beam and outputs the optical signal which an optical change is applied, as the reflection light beam. Each optical modulation wave reflecting unit 21 is installed in an appropriate position in an appropriate precision. The arrangement data of each optical modulation wave reflecting unit 21 (a measurement value of the correct arrangement) is supposed to be previously inputted to the laser ranging apparatus 10 as known data. For example, the arrangement data shows the antenna (sub-array) 20 in which each optical modulation wave reflecting unit 21 is arranged, and an installation position (coordinates data and so on) on the antenna (sub-array) 20. Also, the laser ranging apparatus 10 acquires the arrangement data previously through a manual operation (direct input) or the communication by a file format of a compatible table.

Also, the optical modulation wave reflecting unit 21 carries out a modulation of the incident light beam based on the modulation pattern which is peculiar to the reflecting unit 21. The modulation pattern is supposed to be previously inputted into the laser ranging apparatus 10 as known data. For example, the laser ranging apparatus 10 obtains the peculiar modulation pattern previously through a manual operation (the direct input) or a communication in the file format of a corresponding table and so on.

It should be noted that each of the optical modulation wave reflecting units 21 (21-p, p=1 to P) arranged in each of the antennas (sub-arrays) 20 (20-n, n=1 to N) is provided with a lens, a modulation device such as an LN modulator, and a mirror (not shown). When measuring the relative direction of each antenna (sub-array) 20, three or more optical modulation wave reflecting units 21 (21-p, p=1 to P) are arranged for every antenna (sub-array) 20. However, the present invention is not limited to these examples.

(Overview of Operation)

In the present embodiment, the number (M) of the light sources 11 (11-m, m=1 to M) and the number (M') of the light receiving units 12 (12-m, m=1 to M'), which are mounted on the laser ranging apparatus 10, are determined so that three or more propagation paths of the optical signals are obtained from the light sources 11 (11-m, m=1 to M) to the light receiving units 12 (12-m, m=1 to M') through the optical modulation wave reflecting unit 21. Then, the laser ranging apparatus 10 measures the relative position of the optical modulation wave reflecting unit 21 by a three-point intersection method by using the light sources 11 (11-m, m=1 to M) and the light receiving units 12 (12-m, m=1 to M'). It should be noted that the three-point intersection method is only an example. Actually, the relative position may be measured by using three or more points (equal to or more than three propagation paths of the optical signals) (i.e. a multi-points intersection method).

Specifically, the laser ranging apparatus 10 irradiates a beam to all of the optical modulation wave reflecting units 21 arranged in all of the antennas (sub-arrays) 20 from each light source 11 and receives reflection beams by the light receiving units 12. It should be noted that the beam irradiation is not limited to one time and may be more than one time.

The optical modulation wave reflecting unit 21 modulates the incident beam from each light source 11 with a different code and outputs the modulated beam as the reflection light beam.

Therefore, the measuring unit 13 arranged in the laser ranging apparatus 10 can separate and identify each reflection light beam from each of the optical modulation wave reflecting units 21 from an optical signal, in which the reflection light beams from the optical modulation wave reflecting units 21 are superimposed, by using the modulation pattern corresponding to the optical modulation wave reflecting units 21. Thus, the measuring unit arranged in the laser ranging apparatus 10 can measure (calculate) the relative position of each of the optical modulation wave reflecting units 21 arranged in all of the antennas (sub-arrays) 20 in a high precision.

Also, when three or more optical modulation wave reflecting units 21 are arranged in each antenna (sub-array) 20, the measuring unit 13 can measure (calculate) the relative direction of each antenna (sub-array) 20 by a vector calculation from the measurement values of the relative positions of the optical modulation wave reflecting units 21 arranged in the antenna (sub-array) 20.

(Measuring Method)

Figure 3:
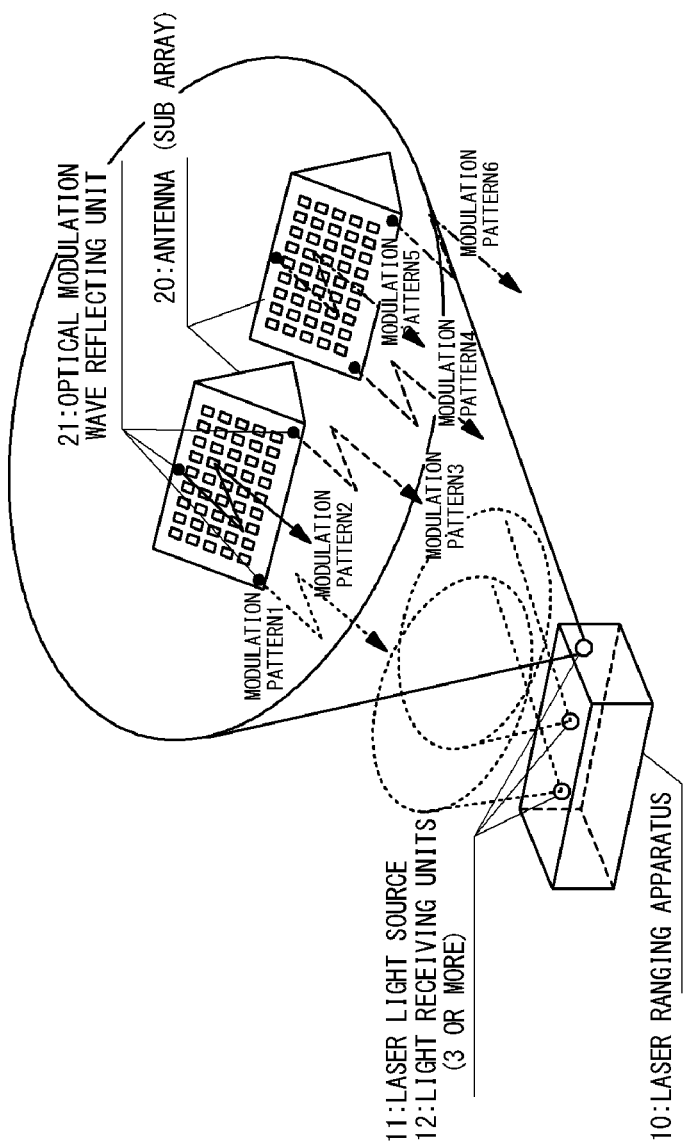
FIG. 3 is a diagram showing the measurement system according to a first embodiment of the present invention.

The details of the measuring method in the present embodiment will be described with reference to FIG. 3.

Each of the light sources 11 arranged in the laser ranging apparatus 10 outputs an optical signal in time division/frequency division. In this case, each of the light sources 11 irradiates a light beam to all of the optical modulation wave reflecting units 21 arranged in all of the antennas (sub-array) 20 to transmit the optical signal.

Each optical modulation wave reflecting unit 21 arranged in each antenna (sub-array) 20 carries out a different optical modulation to the light beam from the light source 11.

Each of the light receiving units 12 arranged in the laser ranging apparatus 10 receives the reflection light beam from each of the optical modulation wave reflecting units 21.

Figure 4:
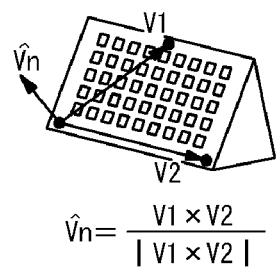
FIG. 4 is a diagram showing a calculating method of a relative direction in the present invention.

The measuring unit 13 arranged in the laser ranging apparatus 10 correlation-processes the received reflection light beam based on the modulation pattern corresponding to each optical modulation wave reflecting unit 21. Also, the measuring unit 13 measures a propagation distance of the optical signal (light beam) from the light source 11 to the light receiving unit 12 through the optical modulation wave reflecting unit 21 in a high precision. Also, the measuring unit 13 measures (calculates) the relative position of each optical modulation wave reflecting unit 21 by the three-point intersection method using the high precision distance measurement results (three or more precision distance measurement results may be used), and measures (calculates) the relative direction of each antenna (sub-array) 20 by using the relative position measurement results, as shown in FIG. 4.

(Configuration Example of Optical Modulation Wave Reflecting Unit)

Figure 5:
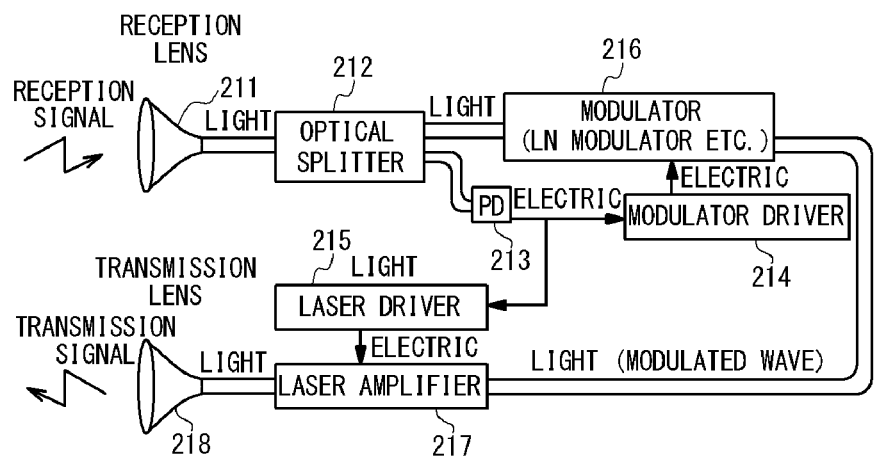
FIG. 5 is a diagram showing an optical modulation wave reflecting unit according to the first embodiment.

A configuration example of the optical modulation wave reflecting unit according to the present embodiment will be described with reference to FIG. 5.

Each of the optical modulation wave reflecting units 21 according to the present embodiment is provided with a reception lens 211, a light splitter 212, a PD (Photo Diode) 213, a modulator driver 214, a laser driver 215, a modulator 216, a laser amplifier 217 and a transmission lens 218.

The reception lens 211 receives an optical signal as a reception signal from each of the light sources 11 arranged in the laser ranging apparatus 10. In this case, the reception lens 211 receives the optical signal by receiving the light beam irradiated from the light source 11 of the laser ranging apparatus 10.

The light splitter 212 distributes the reception signal received by the reception lens 211 into the PD 213 and the modulator 216. The PD 213 converts the optical signal into the electric signal and outputs the electric signal to the modulator driver 214 and the laser driver 215. The modulator driver 214 outputs the electric signal to control the modulator 216 according to the electric signal from the PD 213.

The laser driver 215 outputs the electric signal to control the laser amplifier 217 according to the electric signal from the PD 213. The laser driver 215 receives an output level of each light source 11 arranged in the laser ranging apparatus 10 previously through a manual operation (direct input) or a communication. Also, the laser driver 215 measures the amplitude level of the reception signal based on the amplitude level of the electric signal from the PD 213. Also, the laser driver 215 controls a light amplification factor of the laser amplifier 217 such that the amplitude level of the transmission signal becomes a setting value set through the manual operation (direct input) or the communication in the position of the laser ranging apparatus 10, by using the previously received output levels of the light sources 11 and the amplitude level measurement results of the reception signals. It should be noted that the control of the light amplification factor of the laser amplifier 217 by the laser driver 215 may be omitted. Also, the laser driver 215 and the laser amplifier 217 may be omitted. That is, the laser driver 215 and the laser amplifier 217 are provided according to necessity, and they may be omitted if unnecessary.

The modulator 216 modulates the optical signal from the light splitter 212 according to the electric signal from the modulator driver 214 and outputs the modulated optical signal (modulation wave) to the laser amplifier 217.

The laser amplifier 217 controls the amplitude of the optical signal (modulation wave) from the modulator 216 according to the electric signal from the laser driver 215 and outputs the controlled optical signal to the transmission lens 218. In this case, the laser amplifier 217 controls the output in such a manner that the amplitude of the optical signal (modulation wave) has a constant amplitude on the side of the laser ranging apparatus 10.

The transmission lens 218 transmits the optical signal (transmission signal) from the laser amplifier 217 to the laser ranging apparatus 10. In this case, the transmission lens 218 transmits the optical signal as the reflection light beam to each light receiving unit 12 (12-m, m=1 to M') of the laser ranging apparatus 10.

It should be noted that in the present embodiment, the optical modulation wave reflecting unit 21 is configured such that a time period from the reception of the optical signal to the transmission of the optical signal falls within a predetermined time range.

Also, the present embodiment can deal with both of a case where an optical path in the optical modulation wave reflecting unit 21 is a free space light transmission path which is configured from the mirror and the lens and a case where it is a light transmission path which is configured from a waveguide of a fiber, and a photonic crystal.

(Operation and Effect of First Embodiment)

In the present embodiment, the relative position and relative direction of each of the plurality of antennas (sub-arrays) of the distributed aperture radar immediately spread out in an emergency can be measured.

In order to measure the relative position and relative direction of each antenna (sub-array) as a measurement target, the light beam from the measuring unit in a distant place is irradiated and reflection light beam by a reflection mirror provided to each antenna (sub-array) is measured. At this time, the optical modulation wave reflecting unit which modulates the incident light beam with one of different pseudo random patterns and returns the modulated light is used as the reflection mirror provided to each antenna (sub-array).

In this way, a correlation processing is carried out by use of a replica signal corresponding to the modulation pattern peculiar to the optical modulation wave reflecting unit after measuring the reflection light beams by the measurement unit. Thus, it becomes possible to separate the reflection light beam and identify the antenna (sub-array) from which the reflection light beam is generated.

In the present embodiment, the relative position and relative direction of each of the plurality of measurement targets can be immediately measured in a high precision from a distant place. For example, as mentioned above, the relative position and relative direction of each of the plurality of optical modulation wave reflecting units can be measured in a same time in a high precision by irradiating the light beams from three or more light sources.

[Second Embodiment]

A second embodiment of the present invention will be described. In the second embodiment, a case where a function of the optical modulation wave reflecting unit is simplified will be described.

In the first embodiment, an active device such as the LN modulator is used in the optical modulation wave reflecting unit 21. In the second embodiment, however, a function of the optical modulation wave reflecting unit it simplified by using a passive device such as a polarization element (not shown) in the optical modulation wave reflecting unit 21. The configuration of the measuring system is the same as in the first embodiment.

(Measuring Method)

Figure 6:
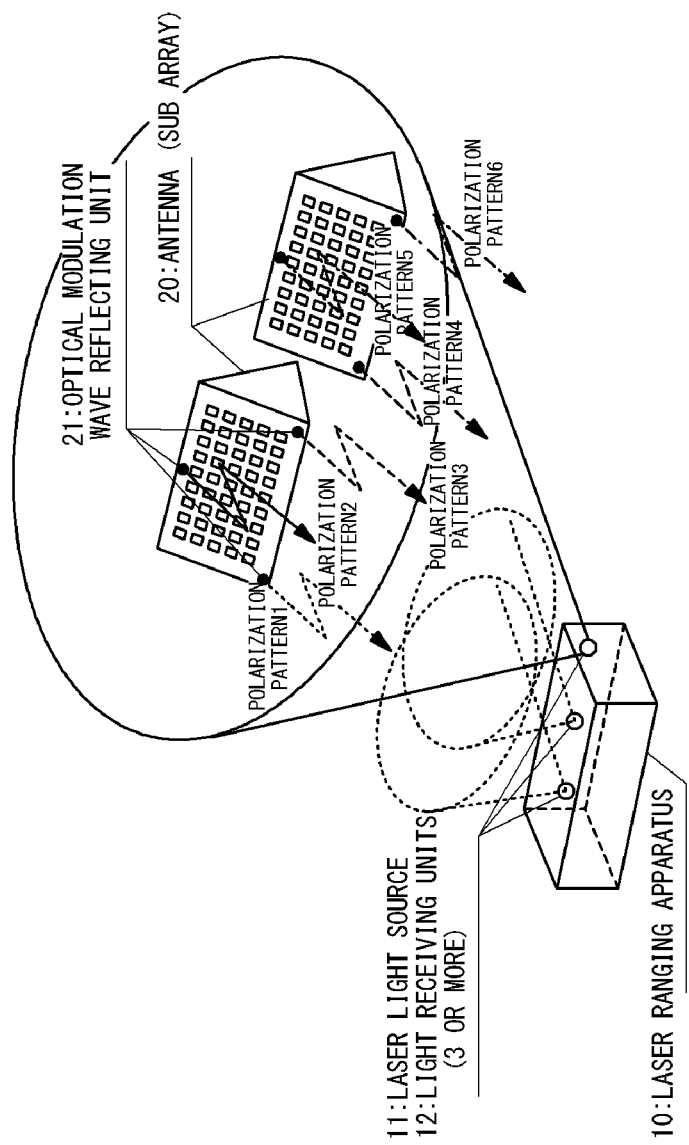
FIG. 6 is a diagram showing the measurement system according to a second embodiment of the present invention.

With reference to FIG. 6, the details of the measuring method in the present embodiment will be described.

Each of the light sources 11 (11-m, m=1 to M) arranged in the laser ranging apparatus 10 outputs the optical signal in a time division/frequency division. In this case, the light source 11 irradiates the light beam to all of the optical modulation wave reflecting units 21 (21-p, p=1 to P) arranged in all of the antennas (sub-arrays) 20 (20-n, n=1 to N), to transmit the optical signal.

In the present embodiment, each optical modulation wave reflecting unit 21 arranged in each antenna (sub-array) 20 applies different polarization to the incident light beam from each light source 11 and reflects the polarized beam by using a polarization element such as a Faraday rotor (not shown). Each of the light receiving units 12 (12-m, m=1 to M') arranged in the laser ranging apparatus 10 receives the reflection light beam from each optical modulation wave reflecting unit 21 through a polarizing filter (not shown). At this time, it is supposed that each light receiving unit 12 has a plurality of polarizing filters in the laser ranging apparatus 10.

The measuring unit 13 arranged in the laser ranging apparatus 10 separates and identifies the received light beam by using the polarization pattern corresponding to each optical modulation wave reflecting unit 21. Thus, the measuring function similar to the first embodiment is realized.

It is suitable that the number of the polarization filters is equal to or greater than the number of polarization patterns. That is, the number of the polarizing filters is equal to or greater than the number of the optical modulation wave reflecting units 21 at least.

(Configuration Example of Optical Modulation Wave Reflecting Unit)

Figure 7:
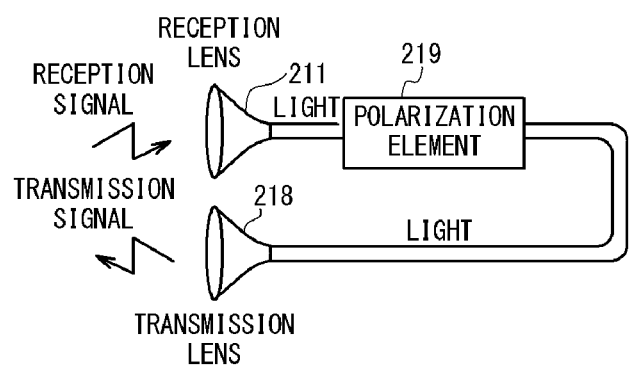
FIG. 7 is a diagram showing the optical modulation wave reflecting unit according to the second embodiment.

With reference to FIG. 7, a configuration example of the optical modulation wave reflecting unit according to the present embodiment will be described.

Each of the optical modulation wave reflecting units 21 (21-p, p=1 to P) according to the present embodiment is composed of a reception lens 211, a transmission lens 218 and a polarization device 219.

The reception lens 211 receives the optical signal (reception signal) from each light source 11 arranged in the laser ranging apparatus 10. In this case, the reception lens 211 receives the optical signal by receiving the light beam irradiated from each light source 11 of the laser ranging apparatus 10.

The transmission lens 218 transmits the optical signal (transmission signal) from the laser amplifier 217 to the laser ranging apparatus 10. In this case, the transmission lens 218 transmits the optical signal by irradiating the light beam to each light receiving unit 12 of the laser ranging apparatus 10.

The polarization device 219 polarizes the optical signal received by the reception lens 211 and outputs the polarized optical signal to transmission lens 218. In this case, the polarization device 219 is adjusted such that the optical signal (the modulation wave) has a constant polarization pattern on the side of the laser ranging apparatus 10.

It should be noted that in this embodiment, each optical modulation wave reflecting unit 21 controls such that a time period from the reception of the optical signal to the transmission of the optical signal falls within a constant time period.

Also, like the first embodiment, the present embodiment can handle both of a case where the optical path in the optical modulation wave reflecting unit 21 is a free space light transmission path in which the optical path is formed by using the mirror and the lens, and a case where the optical path in the optical modulation wave reflecting unit 21 is a light transmission path which uses a waveguide such as a fiber and a photonic crystal. However, when the light transmission using the waveguide is adopted, a polarization maintaining-type light transmission path is adopted.

(Operation and Effect of the Second Embodiment)

The second embodiment is effective when the number of antennas (sub-arrays) is few. Also, by simplifying the function of the optical modulation wave reflecting unit, the cost reduction is possible.

[Third Embodiment]

Below, a third embodiment of the present invention will be described. In the third embodiment, a case that the antenna (sub-array) is movable will be described.

It should be noted that the antenna (sub-array) may be of a mobile type and may be mounted on a mobile unit.

As an example of the mobile unit, it is assumed that the mobile unit is a self-propelled vehicle. Also, a self-movable robot (multi-legged robot and so on), a ship and so on are assumed in addition to the vehicle. Also, the vehicle may be an amphibious vehicle. However, the mobile unit is not limited to these examples.

(Measuring Method)

Figure 8:
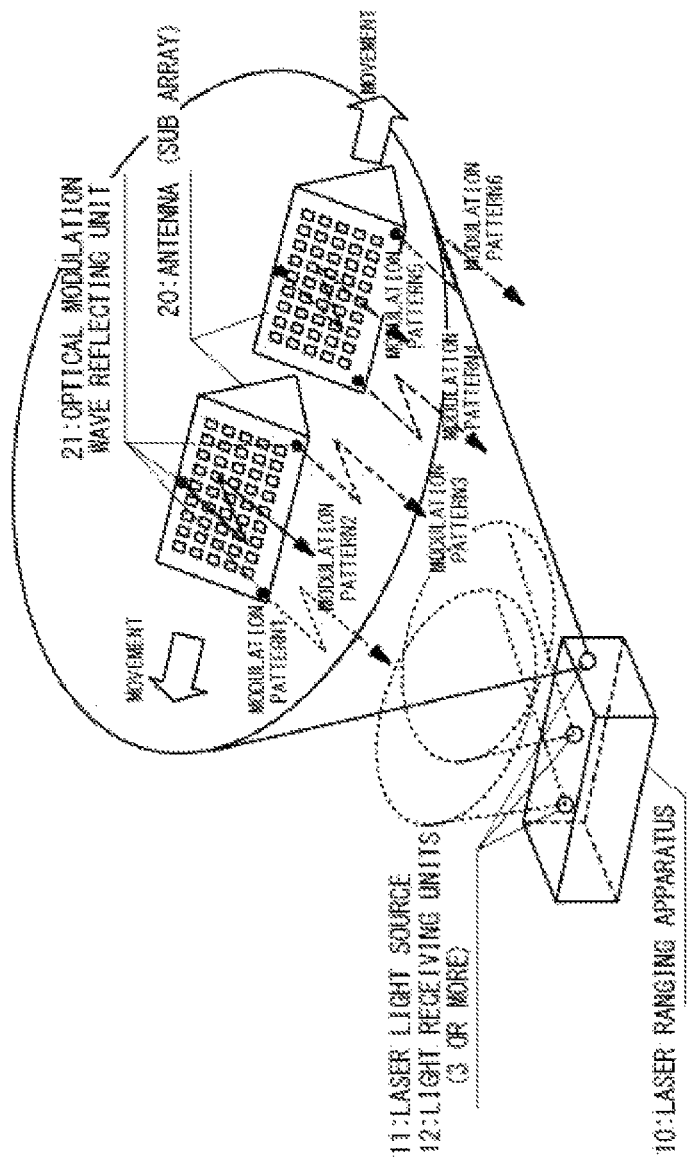
FIG. 8 is a diagram showing the measurement system according to a third embodiment of the present invention.

With reference to FIG. 8, the details of the measuring method in the present embodiment will be described.

Each of the light sources 11 (11-m, m=1 to M) arranged in the laser ranging apparatus 10 outputs the optical signal sequentially/periodically in time-division/frequency-division. In this case, each light source 11 irradiates the light beam sequentially/periodically to all of the optical modulation wave reflecting units 21 arranged in all of the antennas (sub-arrays) 20, to transmit the optical signal.

In the present embodiment, each antenna (sub-array) 20 is mounted on the mobile unit. Or, each antenna (sub-array) 20 itself is the mobile unit. Each optical modulation wave reflecting unit 21 arranged in each antenna (sub-array) 20 applies the optical modulation to the incident light beam from each light source 11 to reflect the modulated beam regardless of a moving state/stop state of the mobile unit.

Each of the light receiving units 12 (12-m, m=1 to M') arranged in the laser ranging apparatus 10 receives the reflection light beam from each optical modulation wave reflecting unit 21.

The measuring unit 13 arranged in the laser ranging apparatus 10 processes correlation of the reception light beam by using the modulation pattern corresponding to the optical modulation wave reflecting unit 21. Also, the measuring unit 13 measures the propagation distance of the optical signal from the light source 11 to the light receiving unit 12 through the optical modulation wave reflecting unit 21 in a high precision. Also, the measuring unit 13 measures a relative position of each optical modulation wave reflecting unit 21 by the three-point intersection method using a high-precision distance measurement results (permitted to use three or more high-precision distance measurement results), and measures a relative direction of each antenna (sub-array) 20 by using the relative position measurement results, as shown in FIG. 4.

Moreover, the measuring unit 13 can measure a relative velocity of each antenna (sub-array) 20 by acquiring time data such as an output period (an output interval) of the light beam and the light reception period (a light reception interval) of the reflection light.

It should be noted that in the present embodiment, a case where the modulation pattern corresponding to each optical modulation wave reflecting unit is used has been described. However, it is possible to use a polarization pattern corresponding to each optical modulation wave reflecting unit, like the second embodiment.

(Operation and Effect of the Third Embodiment)

The third embodiment can be applied to the signal processing (the beam control) of the distributed aperture radar, because the relative position/relative direction of all of the antennas (sub-arrays) can be measured at a moment, even if the antennas (sub-array) of the distributed aperture radar mounted with the optical modulation wave reflecting units is the mobile unit.

[Fourth Embodiment]

Below, a fourth embodiment of the present invention will be described. In the fourth embodiment, a case where the laser ranging apparatus is movable will be described.

It should be noted that the laser ranging apparatus may be of the mobile type and the laser ranging apparatus may be mounted on the mobile unit. Also, the light sources and the light receiving units arranged in the laser ranging apparatus may be moveable/rotary mechanism (turn table and so on). Here, as an example of the mobile unit, a flight vehicle such as an aircraft is assumed. However, the present invention is not limited to these examples.

(Measuring Method)

Figure 9:
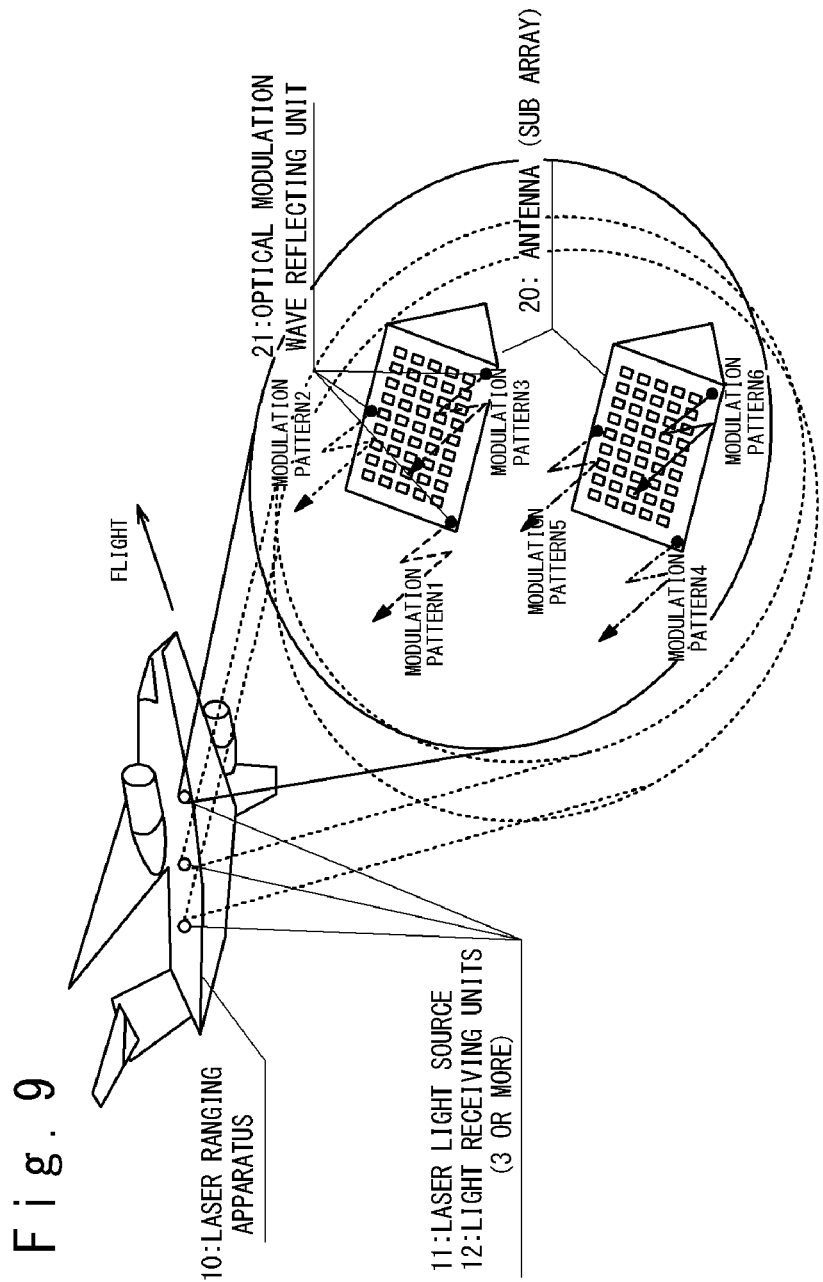
FIG. 9 is a diagram showing the measurement system according to a fourth embodiment of the present invention.

With reference to FIG. 9, the details of the measuring method of the fourth embodiment will be described.

In the present embodiment, the laser ranging apparatus 10 is mounted on the mobile equipment. Or, the laser ranging apparatus 10 itself is the mobile unit. Also, each of the light sources 11 and the light receiving units 12, which are arranged in the laser ranging apparatus 10, may be of a mobile type/a rotary type (turntable and so on), regardless of the movement of the laser ranging apparatus 10. Each light source 11 arranged in the laser ranging apparatus 10 outputs the optical signal sequentially/periodically in time division/frequency division. In this case, each of the light sources 11 irradiates the light beam to all of the optical modulation wave reflecting units 21 arranged in all of the antennas (sub-arrays) 20 sequentially/periodically regardless of the moving state/stop state of the mobile equipment, to transmit the optical signal.

Each optical modulation wave reflecting unit 21 arranged in each antenna (sub-array) 20 applies a different optical modulation to the incident light beam from each light source 11 and then returns it. Each light receiving unit 12 arranged in the laser ranging apparatus 10 receives the reflection light bean from each optical modulation wave reflecting unit 21.

The measuring unit arranged in the laser ranging apparatus 10 correlation-processes the reception light beam with the modulation pattern corresponding to each optical modulation wave reflecting unit 21. Also, the measuring unit measures the propagation distance of the optical signal from the light source 11 to the light receiving unit 12 through the optical modulation wave reflecting unit 21 in a high precision. Also, the measuring unit measures a relative position of each optical modulation wave reflecting unit 21 by the three-point intersection method using the high-precision distance measurement results (permitted to use three or more the high-precision distance measurement results), and measures a relative direction of each antenna (sub-array) 20 by using the relative position measurement result, as shown in FIG. 4.

It should be noted that in the present embodiment, a case where the modulation pattern corresponding to each optical modulation reflecting unit is used has been described, but it is possible to use the polarization pattern corresponding to each optical modulation reflecting unit, like the second embodiment.

(Operation and Effect of the Fourth Embodiment)

Even when the laser ranging apparatus is installed on the mobile unit, the present embodiment can be applied to the signal processing (beam control) of the distributed aperture radar, because the relative position/relative direction of all of the antennas (sub-arrays) can be measured at a moment.

[Fifth Embodiment]

Below, a fifth embodiment of the present invention will be described.

In the fifth embodiment, the third embodiment and the fourth embodiment are combined.

In the present embodiment, a case where the laser ranging apparatus and the antennas (sub-arrays) are movable will be described.

It should be noted that the laser ranging apparatus and the antennas (sub-arrays) in the first embodiment and the second embodiment may be mobile equipments.

It should be noted that actually, the laser ranging apparatus and the antennas (sub-arrays) may be mobile units, or may be installed on the mobile units. Also, the light source and the light receiving unit arranged in the laser ranging apparatus may be a mobile type/a rotary type (a turntable type and so on).

(Measuring Method)

Figure 10:
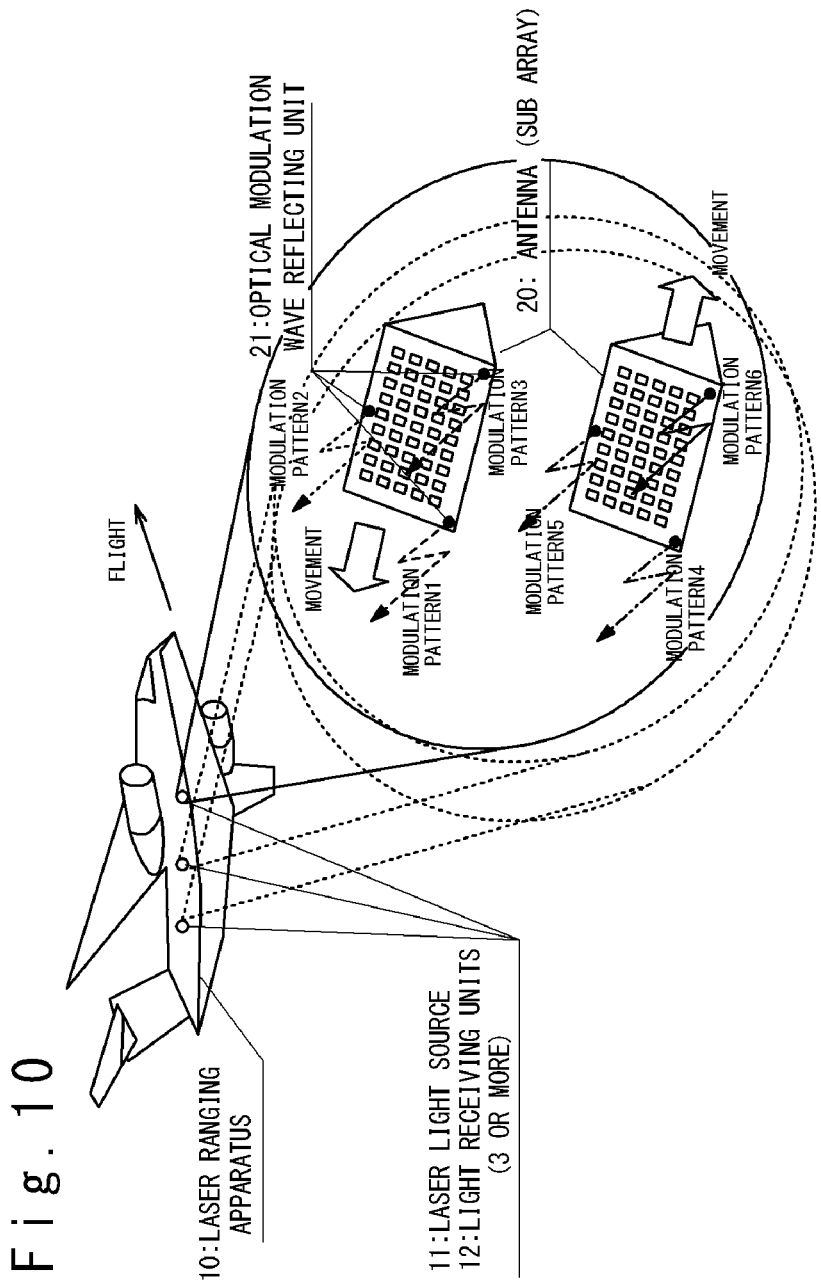
FIG. 10 is a diagram showing the measurement system according to a fifth embodiment of the present invention.

With reference to FIG. 10, the details of the measuring method of the present embodiment will be described.

In the present embodiment, the laser ranging apparatus 10 is mounted on the mobile unit. Or, the laser ranging apparatus 10 itself is the mobile unit. Each of the light sources 11 (11-m, m=1 to M) arranged in the laser ranging apparatus 10 outputs the optical signal sequentially/periodically in time-division/frequency-division. In this case, each light source 11 transmits the optical signal by sequentially/periodically irradiating the light beam to all of the optical modulation wave reflecting units 21 (21-p, p=1 to P) arranged in all of the antennas (sub-arrays) 20 (20-n, n=1 to N) regardless of the moving state/stop state of the mobile unit.

In the present embodiment, each antenna (sub-array) 20 is mounted on the mobile unit. Or, each antenna (sub-array) 20 itself is the mobile unit. Each optical modulation wave reflecting unit 21 arranged in each antenna (sub-array) 20 applies a different optical modulation to the incident light beam from each light source 11 regardless of the moving state/stop state of the mobile unit, and returns the modulated light for reflection.

Each light receiving unit 12 arranged in the laser ranging apparatus 10 receives the reflection light beam from each optical modulation wave reflecting unit 21.

The measuring unit 13 arranged in the laser ranging apparatus 10 correlation-processes the reception light beam with the modulation pattern corresponding to each optical modulation wave reflecting unit 21. Also, the measuring unit measures the propagation distance of the optical signal from the light source 11 to the light receiving unit 12 through the optical modulation wave reflecting unit 21 in a high precision. Also, the measuring unit measures a relative position of each optical modulation wave reflecting unit 21 by the three-point intersection method using the high-precision distance measurement results (permitted to use three or more high-precision distance measurement results), and measures the relative direction of each antenna (sub-array) 20 by using the relative position measurement result, as shown in FIG. 4.

Moreover, the measuring unit 13 acquires time data such as an output period (an output interval) of the beam and a light reception period (a light reception interval) of the reflection light beam and can measure the relative velocity of each antenna (sub-array) 20.

It should be noted that in the present embodiment, a case which the modulation pattern corresponding to each optical modulation wave reflecting unit is used has been described, but it is possible to use a polarization pattern corresponding to each optical modulation reflecting unit, like the second embodiment.

(Operation and Effect of the Fifth Embodiment)

When the laser ranging apparatus 10 and the antennas (sub-arrays) are movable, the present embodiment can be applied to the signal processing (beam control) of the distributed aperture radar, because the relative position/relative direction of all of the antennas (sub-arrays) can be measured at a moment.

<Relation of the Above Embodiments>

It should be noted that the above-mentioned embodiments can be combined within a technical range in which there are no contradiction. Also, in the above-mentioned embodiments, the antenna (sub-array) may be read as an antenna apparatus (sub-array unit). Also, in the above-mentioned embodiments, the laser ranging apparatus or its configuration can be mounted on each antenna (sub-array). For example, each movable antenna (sub-array) may measure a relative position/relative direction mutually through automatic control/autonomous control. Also, the antenna (sub-array) is only an example.

Actually, the measurement target of the present invention is not limited to the antenna (sub-array). Therefore, in the above-mentioned embodiments, the antenna (sub-array) may be read as the measurement target.

(Features)

The present invention can measure a relative position and relative direction of a plurality of measurement targets in a high precision in a same time (immediately) from a distant place by using a reflection mirror installed as the optical modulation wave reflecting unit in the measurement target (an incident light is modulated with a pseudo random pattern and then reflected), and separating and identifying through the correlation process after detecting the reflection light from each reflection mirror by the measuring unit.

The present invention can be applied to a product which needs a precise relative position measurement of an antennas apparatus including the distributed aperture radar.

The present invention has been described in detail, but the present invention is not limited to the above-mentioned embodiments and a modification which does not apart from the scope of the present invention is contained in the present invention.

What is claimed is:

1. A measuring system comprising:
a plurality of measurement targets;
an optical signal input/output unit mounted on each of the plurality of measurement targets, each of the optical signal input/output units configured to receive an optical input signal and output an optical output signal obtained by applying an optical change to the optical input signal by an external modulation; and
a ranging apparatus configured to transmit the optical input signal to the plurality of optical signal input/output units, receive the optical output signals from the plurality of optical signal input/output units, measure a propagation distance of an optical signal from a transmission point of the optical input signal to a reception point of the optical output signal based on the optical output signal for each of the plurality of optical signal input/output units, and measure relative positions of the plurality of measurement targets based on the propagation distances.

2. The measuring system according to claim 1, wherein the ranging apparatus comprises:
a light source configured to transmit the optical input signal to the plurality of optical signal input/output units;
a light receiving unit configured to receive the optical output signals from the plurality of optical signal input/output units; and
a measuring unit configured to measure the propagation distances of the optical signals from the light source to the light receiving unit through the plurality of optical signal input/output units based on the optical output signals, and measure the relative positions of the plurality of measurement targets based on the propagation distances.

3. The measuring system according to claim 2, wherein ranging apparatus comprises one or more light sources and one or more light receiving units,
wherein as independent propagation paths of a light signal from one of the one or more light sources to one of the one or more light receiving units through one of the plurality of optical signal input/output units, there are three propagation paths in case of 3-dimensional measurement and two propagation paths in case of 2-dimensional measurement,
wherein the one or more light sources respectively transmits an optical signal to the plurality of optical signal input/output units, and the one or more light receiving units respectively receives the optical signals from the plurality of optical signal input/output units, and
wherein the ranging apparatus measures the propagation distances of the optical signals from the one or more light sources to the one or more light receiving units through the plurality of optical signal input/output units.

4. The measuring system according to claim 1, wherein each of the plurality of measurement targets comprises one or more of the optical signal input/output units, and
wherein the one or more optical signal input/output units respectively outputs an optical signal obtained by applying the optical change peculiar to the optical signal input/output unit to the optical input signal.

5. The measuring system according to claim 4, wherein each of the one or more optical signal input/output units of each of the plurality of measurement targets carries out a modulation to the optical input signal based on a modulation pattern which is peculiar to the optical signal input/output unit and outputs the optical output signal, and
wherein the ranging apparatus identifies each of the optical output signals based on the modulation patterns.

6. The measuring system according to claim 4, wherein each of the one or more optical signal input/output units of each of the plurality of measurement targets carries out a polarization to the optical input signal based on a polarization pattern which is peculiar to the optical signal input/output unit, and outputs the optical output signal, and
wherein the ranging apparatus identifies each of the optical output signals based on the polarization patterns.

7. The measuring system according to claim 1,
wherein each of the plurality of measurement targets comprises three or more of the optical signal input/output units in case of 3-dimensional measurement and two or more of the optical signal input/output units in case of 2-dimension measurement, and
wherein the ranging apparatus measures the relative position of each of the two or more optical signal input/output units mounted on each of the plurality of measurement targets, and measures the relative directions of the plurality of measurement targets based on the relative positions.

8. The measuring system according to claim 7, wherein at least one of the measurement targets is an antenna.

9. The measuring system according to claim 1, wherein at least one of the plurality of measurement targets and the ranging apparatus is a mobile unit, and
wherein the ranging apparatus sequentially transmits the optical input signal to the plurality of optical signal input/output units, receives the optical output signals from the plurality of optical signal input/output units, measures the propagation distance of the optical signal from the transmission point of the optical input signal to the reception point of the optical output signal based on the optical output signal for each of the plurality of optical signal input/output units, and measures the relative positions of the plurality of measurement targets based on the propagation distances.

10. The measuring system according to claim 1, wherein each of the optical signal input/output units is configured to output the optical output signal obtained by directly applying the optical change to the optical input signal by the external modulation.

11. The measuring system according to claim 1, wherein the ranging apparatus is configured to transmit the optical input signal to the plurality of optical signal input/output units at the same time.

12. A ranging apparatus comprising:
a light source configured to transmit an optical input signal to an optical signal input/output unit of a measurement target;
a light receiving unit configured to receive an optical output signal, which has been obtained by applying an optical change to the optical input signal by an external modulation, from the optical signal input/output unit; and
a measuring unit configured to measure a propagation distance of an optical signal from the light source to the light receiving unit through the optical signal input/output unit based on the optical output signal, and measure a relative position of the optical signal input/output unit based on the propagation distance.

13. A measuring method comprising:
- disposing a plurality of measurement targets;
- transmitting an optical input signal from a ranging apparatus to an optical signal input/output unit mounted on each of the plurality of measurement targets;
- receiving the optical input signal from the ranging apparatus by each of the plurality of optical signal input/output units and transmitting, by each of the plurality of optical signal input/output units, an optical output signal, which has been obtained by applying an optical change to the optical input signal by an external modulation, to the ranging apparatus;
- receiving the optical output signals from the plurality of optical signal input/output units by the ranging apparatus;
- measuring a propagation distance of an optical signal from a transmission point of the optical input signal to a reception point of the optical output signal based on the optical output signal for each of the plurality of optical signal input/output units, by the ranging apparatus; and
- measuring relative positions of the plurality of measurement targets based on the propagation distances.

14. The measuring method according to claim 13, further comprising:
- measuring relative directions of the plurality of measurement targets based on three or more relative positions of the optical signal input/output unit mounted on each of the measurement targets.

* * * * *